United States Patent Office 3,465,204
Patented Sept. 2, 1969

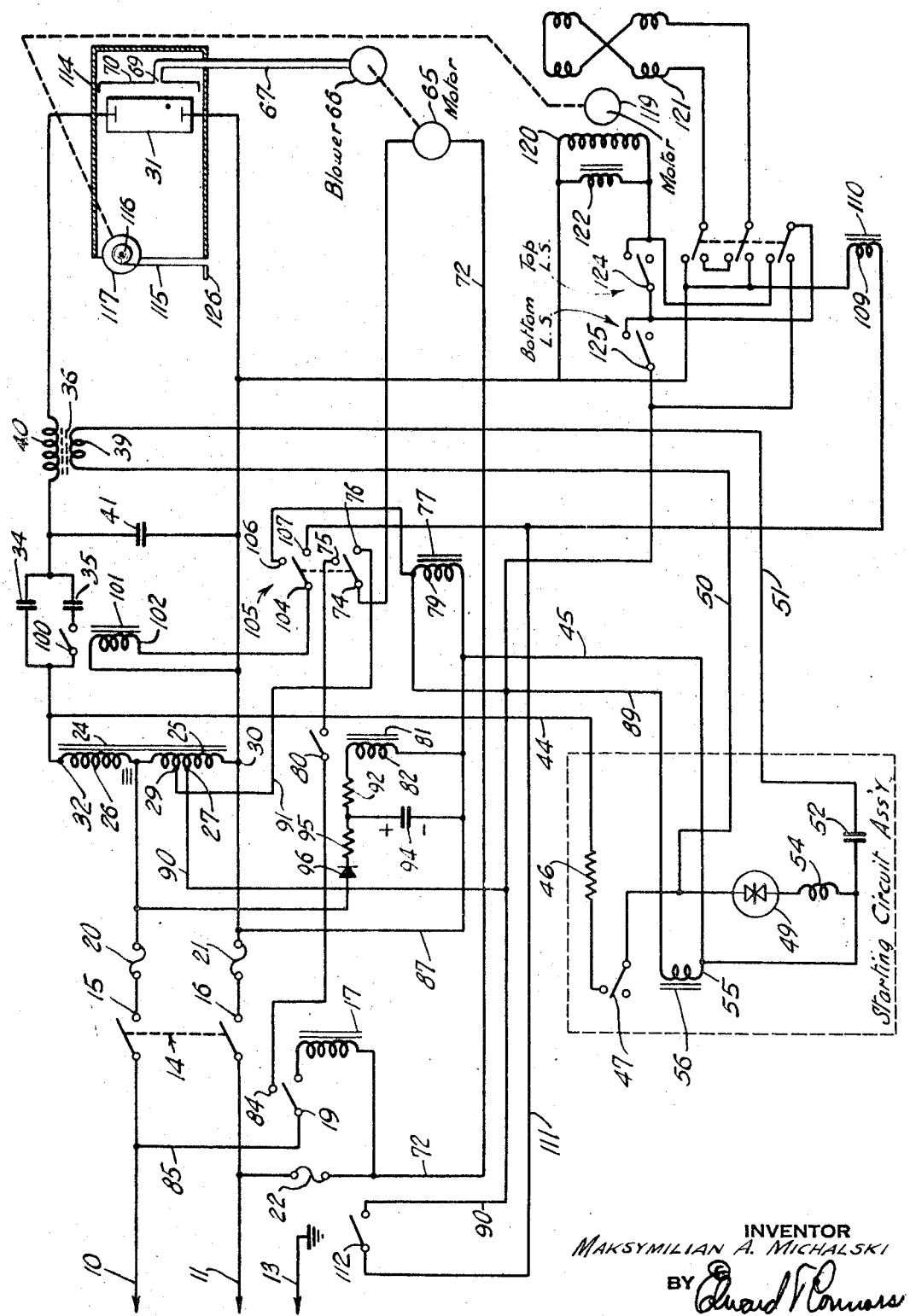

3,465,204
ELECTRIC SYSTEM
Maksymilian A. Michalski, Woodside, N.Y., assignor to Berkey Photo, Inc., New York, N.Y.
Filed July 25, 1967, Ser. No. 655,954
Int. Cl. H05b 41/14
U.S. Cl. 315—363                                        6 Claims

ABSTRACT OF THE DISCLOSURE

An electric system for operation of a gas discharge lamp includes first and second capacitor means adapted to be switched into the circuit in series with the discharge lamp for variation in the power output thereof. The discharge lamp is enclosed in a housing having a shutter which is opened to emit light as for an exposure. Electric circuit means is provided so that upon energization of the lamp both capacitors are connected in parallel therewith so that the lamp is fully loaded upon ignition so that it will arrive at operating temperature as soon as possible. In addition the shutter means is closed. Upon arriving at operating temperature time delay means is actuated disconnecting one of the capacitors from the circuit so that the light operates in stand-by condition. Switching means is provided so that when an exposure is to be made the shutter means is opened and the second capacitor is switched into the circuit so that the full light output of the lamp is available. Upon the termination of the exposure the switching means causes the second capacitor to be disconnected and the shutter to be closed.

---

The present invention relates to an electric system including a gas discharge lamp enclosed in a light housing having a shutter and circuit means for operation of the lamp and the shutter.

In the use of discharge lamps in the photocopy and graphic arts fields particularly in the case for short exposures a considerable amount of time is wasted if the discharge lamp is started and stopped for each operation. The discharge lamp is of the type including mercury and a metal additive in the form of a halide which even with improved circuits requires almost a minute for warm-up time and almost another minute to cool off so that it can be restarted for another exposure.

The present invention aims to overcome the difficulties and disadvantages of operating such lamps by incorporating the lamp in a housing having a shutter. An electric circuit is provided for the lamp so that it may be quickly warmed at full power to operating temperature with the shutter closed. After approximately one minute the power is reduced, the blower starts to operate at reduced volume and the lamp is ready for an exposure. At the time the exposure is to be made a switch is operated which automatically opens the shutter and at the same time energizes the lamp to full power, and maintains it at full power during the exposure time. At the end of an exposure the shutter is closed, the lamp power is reduced, the blower continues in operation at reduced power, and the lamp is in standby condition ready for another exposure. In addition the electric system is such that when the lamp is turned off the blower operates at an increased air output rate so that the lamp is rapidly cooled so as to be ready for another operation.

Objects and advantages of the invention will be apparent from the following description and from the accompanying drawing which shows, by way of example, an embodiment of the invention.

The drawing is a schematic circuit of the system in accordance with the invention.

Referring to the drawing there is shown in FIGURE 1 a pair of terminals 10 and 11 adapted to be connected to an alternating current source preferably in a voltage range of 200 to 250 volts. A ground terminal 12 is also provided. A main electric switch 14 includes terminals 15 and 16. The switch 14 may be operated with a relay 17 controlled by a remotely positioned manual switch 19. Suitable fuses 20 and 21 are provided for the main circuit and a fuse 22 is provided for the control circuit. The alternating current source is supplied to an autotransformer 24 having a primary coil 25 and a secondary coil 26. The primary coil 25 may be tapped as indicated at 27 to provide a control voltage and tapped also at 29 to provide a somewhat higher voltage for reduced power blower operation. Terminal 30 of the autotransformer 24 is directly connected to one of the terminals of a discharge lamp 31. Terminal 32 of the autotransformer 24 is connected through parallel connected capacitors 34 and 35 and through a starting transformer 36 to the other terminals of the discharge lamp. The discharge lamp 31 may be of the order of 2000 watts and may have a 4 inch arc length one inch in diameter, and is of the metal halide type which provides a spectral output in the desirable range which depends on the type of the halide used.

The lamp may be started in any suitable manner although a preferred starting means is shown in U.S. Patent 3,309,566 issued Mar. 14, 1967 to the applicant herein. In the starting circuit of the patent coupling transformer 30 is preferably of the ferrite core type having low inductance at operating frequency so that it may be left in the circuit during operation. This transformer has a primary 39 of few turns and a secondary 40 of more turns so as to provide a step up ratio. A bypass capacitor 41 is connected across the series connected starting transformer 36 and the lamp 31 to pass the high frequency pulses provided by the starting circuit. At the operating frequency the bypass capacitor 41 has practically no effect. The starting circuit is supplied by a pair of terminals 44 and 45 supplied by alternating current at the voltage of the output of the autotransformer 24. Terminal 44 is connected through a resistor 46 and a relay operated starting switch 47 to one terminal of a switching diode 49. The same terminal of the switching diode 49 is connected through a lead 50 to one side of the primary 39 of the starting transformer 36. The other side of the primary 39 is connected by a lead 51 through a capacitor 52 and an inductance 54 to the other side of the switching diode 49. The connection point between the capacitor 52 and the inductance 54 is connected to coil 55 of a time delay relay 56 actuating the starting switch 47.

In the operation of the starting circuit, when the alternating current is applied to the switching diode 49 and to the capacitor 52 the capacitor is charged to the breakdown voltage of the switching diode 49 which discharges the capacitor through the starting winding 39, one or more of high frequency damped pulses being provided for each half cycle of alternation of the main supply.

A blower motor 65 is adapted to power a blower 66 in fluid communication with the discharge lamp 31 by air passage means 67, the air passage means 67 being terminated by one or more nozzles 69 directed at the surface of the discharge lamp 31. If desired the nozzles 69 may extend through a reflector 70 for the discharge lamp 31. The motor 65 is adapted to operate under partial or full voltage, the output of the blower 66, of course, depending upon the voltage applied to the motor 65. The motor 65 is connected by a lead 72 through the fuse 22 to the alternating current supply terminal 11. The other terminal of the blower motor 65 is connected through midpoint 74 of a double throw switch having terminals 75 and 76, the double throw switch being actuated by a time delay relay 77 having a relay coil 79. Terminal 75 is connected through a relay operated switch 80 actuated by a relay 81 having a relay coil 82. The switch 80 is series connected through contact 84 of the switch 19 and a lead 85 to the alternating current supply terminal 10.

The relay 56 is provided for time delay disconnect means operative after 2 or 3 seconds of operation so that the starting circuit is disconnected after this time. Relay 77 is provided with a time delay period of one minute, this relay being connected through a lead 87 to one terminal of the alternating current supply, its other terminal being connected by a lead 89 leading to one side of the coil 55 of the time delay starting relay 56 and also to lead 59 leading to the starting switch 60. Lead 59 is connected through lead 90 to the low voltage terminal 27 of the autotransformer 24. The higher voltage terminal 29 of the autotransformer 24 is connected through a lead to the terminal 76 of the double throw switch 74 thereby providing a source of partial voltage for the motor 65 when the switch 74 is making contact with the terminal 76. However under no voltage condition for the coil 79 of the relay 77 the double throw switch 74 is normally making contact with terminal 75 connected to the switch 80.

Switch 80 is controllable by the relay 81 having its coil 82 connected through a resistor 92 across the terminals of a capacitor 94, the capacitor 94 in turn being connected at one side through lead 87 to the alternating current supply. The other side of the capacitor 94 is connected through a resistor 95 and a diode 96 to the other side of the alternating current supply line on the load side of the switch 15 so that this circuit is deenergized by the opening of the main switching means 14. The diode 96 is poled so as to apply the proper polarity to the capacitor 94 so that the relay 81 is held closed for a predetermined time after the main switch 14 has been opened, the period of time being determined by the R-C constant of the resistance 92 and the capacitance 94. The capacitance 94 is selected with a large value so that the switch 80 is held closed for approximately one minute. It is this switch 80 which controls operation of the blower motor 65 after the main switch 14 has been opened.

In order that the discharge lamp may be operated at full power during the starting period and during the time when the lamp is in use the capacitors 34 and 35 are provided for full power operation of the discharge lamp. However, during the standby period in order to save power and reduce heating the discharge lamp is operated under partial power with the capacitor 34 in operation and the capacitor 35 disconnected. A switch 100 is connected in series with the capacitor 35 across the capacitor 34. This switch 100 is operated by a relay 101 having a relay coil 102 connected at one end to the alternating current supply on the load side of the main switch 14, the coil 102 being connected at its other end to the central contact 104 of a double throw switch 105 having fixed contacts 106 and 107. Contact 106 is connected to the wire 90 leading to a low voltage tap 27 on the autotransformer primary 25. Contact 107 is connected to coil 109 of a relay 110 and through a lead 111 to a switch 112 which is actuated to provide the start and end of a period of operation of the discharge lamp 31 as for making an exposure or the like.

The discharge lamp 31 is enclosed in a housing 114 having a shutter 115 positioned across an opening in the front of the housing. The shutter 115 is adapted to be raised and lowered by means of a roller 116 which may be rotated by a pulley 117 driven by a motor 119 through a mechanical connection 118. The housing 114 and its shutter 115 may be of any suitable construction and adapted to be motor operated so that the light emission from the housing 114 may be controllable as desired.

The motor 119 is provided with a fixed winding 120 and a reversible winding 121. A motor brake 122 stops the rotation of the motor as soon as power is removed from the winding 120. The contacts 123 actuated by the relay 110 are conventional reversing motor contacts for changing the direction of rotation of the motor.

In the operation of the electric system in accordance with the invention the manual switch 19 is closed actuating relay 17 which closes the main switch 14 to energize the autotransformer 24. The starting circuit applies pulses for 2 or 3 seconds across the starting transformer 36. The discharge lamp 31 becomes ignited and the starting circuit is cut off by action of the time delay relay 56.

At the same time that the main switch was energized the time delay relay 77 was energized. However, relay 77 does not operate until the expiration of a predetermined time delay period of about one minute. Coil 102 is energized through contact of the center point 104 of double throw switch 105 with contact 106, thus switch 100 is closed connecting capacitor 35 in parallel with capacitor 34 thereby passing full current to the discharge lamp 31 so that it is warmed up to operating temperature as quickly as practicable. The time delay relay 77 is provided with the delay period of about one minute which allows ample time for the warming of the lamp 31 to operating temperature. Upon the actuation of relay 77 switch 74 is moved to contact 76 thereby energizing the blower motor 65 at partial voltage. The blower 66 then starts cooling lamp 31. The operation of relay 77 also causes the center point 104 of double throw switch 105 to switch from contact 106 to contact 107 which deenergizes coil 102 allowing switch 100 to open providing reduced power operation. Relay 101 and motor 110 are ready for operation by the closing of switch 112. The operating relay 110 for the motor 119 operates through top and bottom limit switches numbered 124 and 125 respectively which are arranged to be tripped by operating arm 126 carried by the shutter 115. Thus the shutter is already down in position to block light from the discharge lamp 31 before an exposure is started and the lamp is in standby condition.

In order to make an exposure the switch 112 is closed thereby simultaneously applying full power to lamp 31 by causing the closing of the switch 100 bringing capacitor 35 into the circuit and at the same time the time relay 110 is actuated causing the motor 119 to be energized to raise the curtain 115 so that the exposure may be started by light from the lamp 31. When the curtain 115 has reached the upper limit of its travel contact switch 124 discontinues further operation of motor 119 and locks its motor brake 122. The motor circuit is then ready to be powered through lead 90 as soon as relay 110 is deenergized.

While the invention has been described and illustrated with reference to a specific embodiment thereof it will be understood that other embodiments may be resorted to without departing from the invention. Therefore, the form of the invention set out above should be considered as illustrative and not as limiting the scope of the following claims.

I claim:

1. An electric system comprising a source of electric current, a gas discharge lamp, a first capacitor connected in series with said gas discharge lamp for partial power operation thereof, a second capacitor, capacitor switching means for said second capacitor connecting said second capacitor in parallel with said first capacitor for full power operation of said discharge lamp, a housing for said discharge lamp, shutter means in the housing operable to pass light from said discharge lamp and closable to substantially block the passage of light from said discharge lamp, main switching means operable to connect said first capacitor and said discharge lamp to said source of electric current, first relay means energizable for operation of said capacitor switching means, said first relay means connected for energization by said main switching means, time delay means operable at a predetermined time and connected to deenergize said first relay means so that said second capacitor is disconnected, said time delay means connected to start its timing period upon the closing of said main switch, reversible motor means operable to open and close said shutter, switching means for said motor normally connected to move said shutter into closed position, normally open means connected for operation of said motor in the reversible direction to open said shutter, said circuit means also connected to said first relay operative to connect said second capacitor, and exposure switch means connected between said source of electric current and said circuit means and operable to energize said circuit means whereby said shutter is opened and said second capacitor is connected to said discharge lamp so that it is operated at full power.

2. An electric system according to claim 1 in which double throw switching means is included, the double throw switch having a center pole and two contacts, the center pole of said switching means being connected to said first relay means, one of said contacts being connected to said exposure switch, the other of said contacts being connected to said source of current on the load side of said main switch.

3. An electric system according to claim 1 in which said shutter is of the roller type.

4. An electric system according to claim 1 in which said switching means for said second capacitor is a relay operated switch in series with said second capacitor.

5. An electric system according to claim 2 in which second relay means is provided and constructed to operate said double throw switching means, and circuit means is provided connecting the coils of said first and second relays in series across the load side of said main switching means.

6. An electric system according to claim 2 in which step down voltage means is connected on said load side of said main switching means, and circuit means are provided connecting said other of said contacts to said stepped down voltage.

References Cited
UNITED STATES PATENTS

| | | | |
|---|---|---|---|
| 2,531,924 | 11/1950 | Smyth | 240—46.03 X |
| 2,617,013 | 11/1952 | Smyth | 315—112 X |
| 3,034,029 | 5/1962 | Logan | 240—46.11 X |
| 3,359,454 | 12/1967 | Scheppe | 315—117 |
| 3,397,612 | 8/1968 | Ludloff | 315—241 X |

JOHN W. HUCKERT, Primary Examiner

J. R. SHEWMAKER, Assistant Examiner

U.S. Cl. X.R.

315—117, 227